Nov. 20, 1928.
A. E. STENBERG
1,692,001
RESILIENT WHEEL
Filed June 18, 1927
2 Sheets-Sheet 2
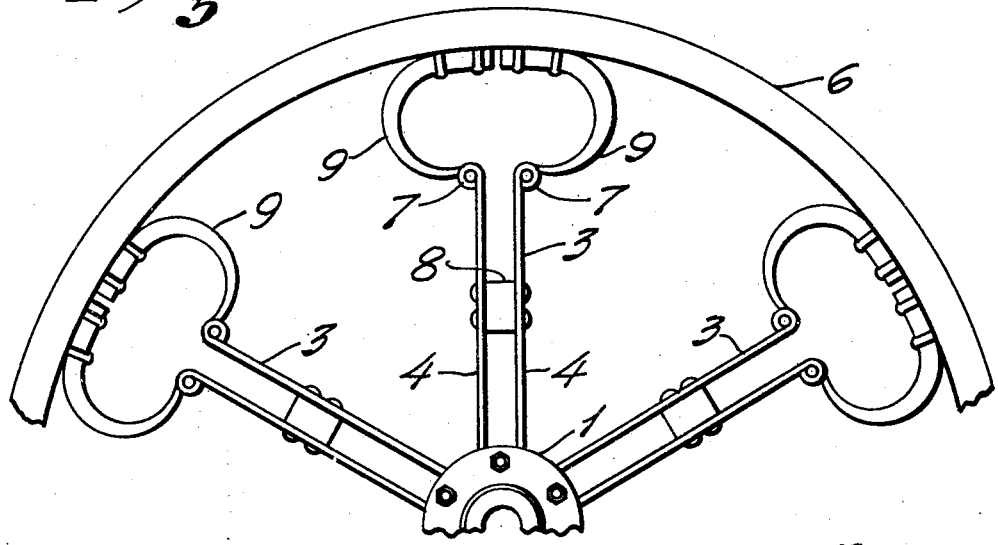
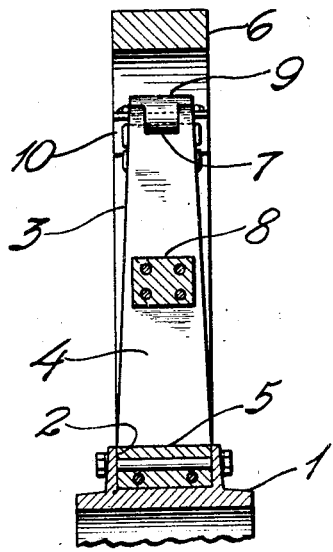 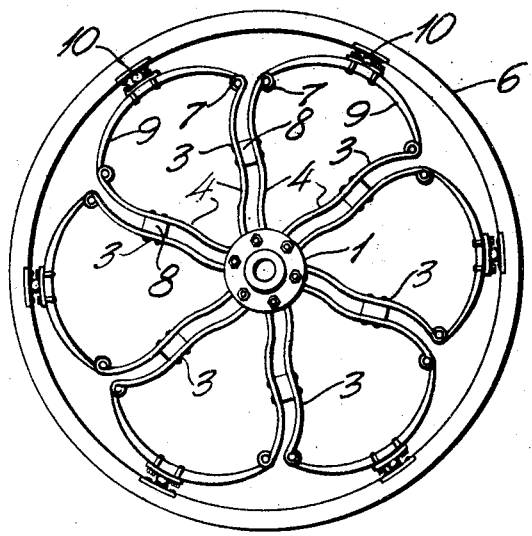
Inventor
Arvid E. Stenberg
By Adam E. Fisher
Attorney Patented Nov. 20, 1928.

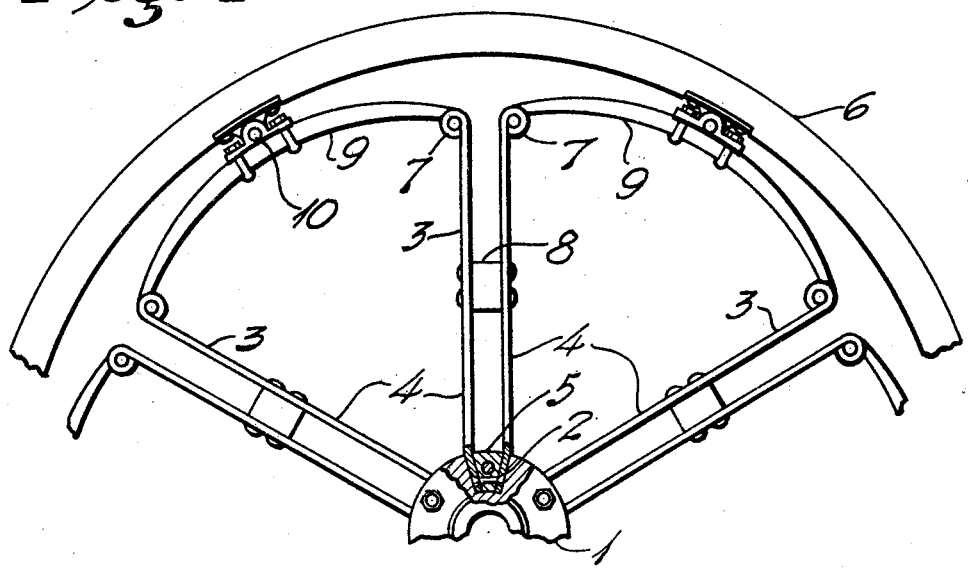
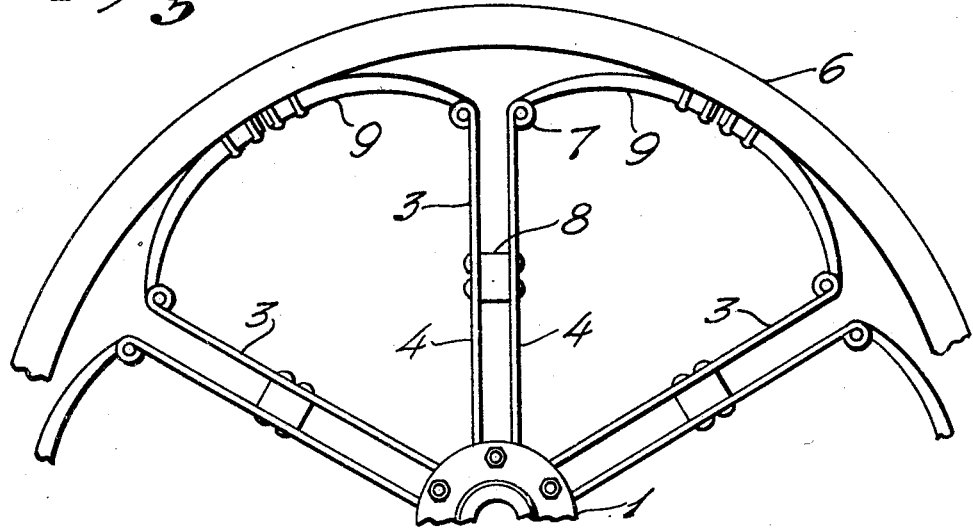

1,692,001

UNITED STATES PATENT OFFICE.

ARVID E. STENBERG, OF REED CITY, MICHIGAN.

RESILIENT WHEEL.

Application filed June 18, 1927. Serial No. 199,648.

This invention relates to improvements in resilient wheels and has especial reference to a spring spoke for use in such a wheel, and has as one of its objects to provide a spoke adapted to yield in the plane of the wheel but not laterally thereto.

Another object is to provide a spoke which may be manufactured at small cost, and adapted to replace an ordinary wood spoke in a wheel of usual construction.

Another object is to provide such a wheel having two sets of coacting springs, one set of said springs being adapted to yield perpendicularly to the axis of the wheel, and the other set of springs being adapted to yield tangentially to the axis of the wheel.

Another object is to provide such a wheel wherein the driving or braking torque applied to the wheel will be absorbed by both of said sets of springs acting conjointly and co-operatively.

Another object is to provide said sets of springs in a manner such that one set of springs is positioned in the plane of the wheel and radially from the axis thereof, and the other set of wheels is positioned in the plane of the wheel and tangentially to the axis thereof.

Another object is to provide said sets of springs in a manner such that one set of springs is adapted to act as a resilient column yieldable tangentially to the axis of and in the plane of said wheel, and the other set of springs is adapted to act as a resilient beam yieldable perpendicularly to the axis of and in the plane of said wheel.

With the above and other objects in view, my invention consists in the combination and arrangement of parts hereinafter described and claimed, and more particularly illustrated in the accompanying drawings, wherein Figure 1 is a fragmentary side view of a portion of a wheel showing the preferred embodiment of my invention.

Figure 2 is a fragmentary side view of a portion of a wheel having a modified form of my invention embodied therein.

Figure 3 is a view similar to Figure 2 and showing another modification.

Figure 4 is a fragmentary transverse sectional view of a wheel having the form of my invention as shown in Figure 1 embodied therein.

Figure 5 is a side view of a wheel as shown in Figure 1 showing the action of the resilient spokes under a driving or braking torque.

Referring now more particularly to the drawings, I provide a hub 1 of usual construction having a plurality of recesses 2 therein for the reception of the radial spokes 3. Each of said spokes comprises a pair of spaced and parallel resilient columns 4 positioned in the plane of the wheel and radially from the axis thereof and fastened together at the inner or hub end as by a block 5 secured in the recess 2. The outer ends of the said resilient columns terminate short of the rim 6 of the wheel, and each column is pivotally connected transversely of the plane of the wheel, as at 7, to a resilient beam or leaf spring 9 positioned in the plane of the wheel and tangentially to the axis thereof. A block 8 connects the said pair of resilient columns 4 intermediately of their ends.

In the preferred embodiment shown in Figure 1 the adjacent resilient beams 9 are connected together and pivotally mounted as at 10 transversely of the plane of the wheel, whereby the said adjacent beams 9 are adapted to act as a continuous resilient beam supported intermediately of its ends.

In the embodiment shown in Figure 2 the resilient beam 9 is mounted on the interior periphery of said rim 6 intermediately of the adjacent spokes of the wheel, and in the embodiment shown in Figure 3 the said resilient beam 9 is returned upon itself and mounted on the interior periphery of said rim 6 oppositely of each column 4.

In use, the resilient columns are adapted to act as springs yieldable tangentially to the axis of and in the plane of said wheel, and the resilient beams are adapted to act as springs yieldable perpendicularly to the axis of and in the plane of said wheel, as shown in Figure 4. The blocks 8 act to restrain the yielding action of said resilient columns so that said columns conjointly act as a frame fixed at one end and connected by a rigid brace at the other end, the terminal portions of the columns of the frame being extended so as to act as columns fixed at one end and free at the other end.

Under the action of driving or braking torque the resilient columns will yield tangentially to the axis of and in the plane of the wheel, thereby shortening their effective length, thus causing the resilient beams to flex inwardly of the rim, as shown in Figure 5. Under the action of a weight applied to the axis of the wheel, the resilient spokes under the axis will act as frames yieldable in a reverse curve, the coacting resilient beams being flexed outwardly of the axis, and the spokes over the axis will act as tension members, the coacting resilient beams being flexed inwardly of the rim, while the spokes on either side of the axis will yield tangentially to the axis of and in the plane of the wheel, so as to shorten their effective length and thus cause the coacting beams to flex inwardly of the rim. By this construction I cause all the spokes of the wheel to act conjointly in carrying a weight applied to the axis of the wheel or to absorb the driving or braking torque applied thereto.

In the preferred embodiment shown in Figure 1 the adjacent resilient beams 9 act as a continuous beam supported intermediately its ends so that a flexure of one end of said continuous beam in one direction will urge the other end in the other direction, thus causing adjacent spokes to act against each other, thereby preventing the excessive vibration of the axis of the wheel relatively to the rim thereof.

I claim:

1. A wheel having a plurality of resilient spokes, each of said spokes comprising a resilient frame positioned in the plane of the wheel radially from the axis thereof, a plurality of resilient beams positioned in the plane of the wheel tangentially of the axis thereof and mounted on the inner periphery of the rim of the wheel intermediately of the spokes, and the outer ends of the frames being extended and hinged to said beams.

2. A wheel having a plurality of resilient spokes, each of said spokes comprising a pair of spaced and parallel resilient columns connected together intermediately of their ends and positioned in the plane of the wheel radially from the axis thereof, and a plurality of resilient beams each pivotally mounted on the rim of the wheel and positioned in the plane of the wheel tangentially to the axis thereof and intermediately of said spokes, each of said columns being hinged to one of said beams.

3. In a wheel, a resilient spoke comprising spaced and parallel radially extending resilient members fixed at their inner ends and rigidly connected intermediately their ends, the outer ends of each of said members being hingedly connected to the rim of the wheel.

In testimony whereof I affix my signature.

ARVID E. STENBERG.